United States Patent Office 3,409,541
Patented Nov. 5, 1968

3,409,541
METHOD OF FLUID CATALYTIC CRACKING OF METAL CONTAMINATED FEEDS
Robert L. Flanders, San Anselmo, and Charles E. Rudy, El Cerrito, Calif., assignors to Chevron Research Company, San Francisco, Calif., a corporation of Delaware
No Drawing. Continuation-in-part of application Ser. No. 361,875, Apr. 22, 1964. This application July 14, 1966, Ser. No. 565,073
4 Claims. (Cl. 208—120)

ABSTRACT OF THE DISCLOSURE

The process is directed to an improvement in catalytic cracking of hydrocarbonaceous feeds contaminated with metallo organic compounds wherein the feeds are cracked in a reaction zone in the presence of a finely divided fluidized catalyst and the catalyst is continuously circulated through a reaction zone and a regeneration zone. Finely divided material is introduced to the circulating fluidized catalyst and together with at least some of the metals of said contaminants and siliceous catalyst fines forms under the conditions in the regeneration zone a sintered product containing said contaminating metal thereby rendering said contaminating metal catalytically inactive and withdrawing sintered product from the circulating fluid catalyst. The finely divided material which is added is selected from the group consisting of alkali metal, alkaline earth metal and boron compounds.

---

This application is a continuation-in-part of application Ser. No. 361,875 filed Apr. 22, 1964, now abandoned.

The present invention is concerned with the catalytic cracking of hydrocarbonaceous feeds containing organo metallic compounds and relates more particularly to cracking of such feeds with fluid catalysts which are normally adversely affected by these organo metallic compounds which contaminate such feeds particularly the heavier boiling fractions.

One major problem encountered in fluid catalytic cracking of hydrocarbonaceous feeds from the higher boiling and residue fractions of petroleum is that such feeds are generally contaminated with organo metallic compounds such as vanadium, nickel, copper, chromium and iron combined within organic molecular structures and these metal contaminants will deposit active metals on the catalyst particles during the fluid catalytic cracking treatment, thereby effecting an undesirable increase in gas and coke production at the expense of the desired liquid products.

Various methods have heretofore been proposed in connection with metal contaminated feeds for fluid catalytic cracking. Some methods as exemplified by Patent No. 2,902,429 are directed to pretreatment of the contaminated feed to reduce the content of metal contaminants such as to below about 2 to 4 p.p.m. Alternatively, petroleum feeds are carefully fractionated to exclude the heavier gas oils and residue materials in which the metallic contaminants are generally concentrated. Other methods are directed to removing the metal contaminants after they have become deposited on the fluid catalysts, most of these methods requiring expensive additional equipment, for example, to remove slip streams of circulating catalyst for contact with ion exchange materials or for separate treatments often amounting to reconstitution of the catalyst.

According to the present invention, the effects of metal contaminants in the feeds to a fluid cracking operation are minimized without having to resort to pretreatment of the feed or to withdrawal of the catalyst from the fluid cracking system for special treatment. The method is particularly advantageous since only minor equipment additions are required to carry out the process. The present process reduces the build-up on the catalyst of active metal deposits which increaes the production of light gases and coke.

As indicated, the process is an improvement on the catalytic cracking of hydrocarbonaceous feeds contaminated with metallo organic compounds wherein such feeds are converted to lower boiling compounds in the presence of finely divided fluidized catalyst in a reaction zone, the catalyst is continuously circulated through said reaction zone and a regeneration zone and the metal contaminants in said feed normally deposit metal on the catalyst. The improvement of minimizing the metal deposits and their adverse effects on the catalytic cracking operation is accomplished by introducing into the circulating fluidized catalyst a finely divided material which prevents the formation and retention on the catalysts of active metal deposits from the contaminants. An explanation for the effectiveness of the added material is that it promotes the sintering of the metals from the contaminants into an inactive form. The added material is composed of at least one compound of alkali metal, alkaline earth metal or boron which compound may through sintering and/or solid-solid diffusion combine with siliceous catalyst, particularly with the catalyst fines or with extraneous siliceous fines, to form sintered product or material. Since the oxides of some of the contaminating metals, notably the oxides of nickel and iron, are fluxes, these oxides become a part of the sintered material. Other metal compounds, especially the oxides which form in the oxidizing atmosphere in the regeneration zone, will be occluded at least to some extent in the sintered material and thereby rendered innocuous and catalytically inactive. If the particle size of the added material is too large, the resulting sintered product could form into large inert particles which would adversely affect the fluidization of the circulating catalyst, could absorb and thus deactivate catalyst particles and would be difficult to separate from the active catalyst particles. Hence the added material is finely divided, preferably with an average size less than 10% of the average particle size of the fluidized catalyst. With a mass of fluidized catalyst having particle sizes ranging from 20 to 200, usually 40–100, microns and an average size of 65 microns, the average particle size of the particle material is preferably less than 5 microns and with no more than about 10% of the added material having a particle size above 25 microns. Generally, it is desirable to have substantially all of the added material at less than one micron in size.

With the small particle size of the added material, it is possible to form the sintered product material in small portions throughout the catalyst mass without having to introduce excessive amounts of heat which would damage the catalyst. Under the oxidizing conditions of regenerating coke-containing cracking catalyst, the finely divided added materials are believed to sinter as individual centers of coke on the catalyst burn to produce local high temperatures adjacent to particles of the added materials. The sintered product incorporates or occludes the contaminating metal oxides or at least a significant portion thereof and thereby renders the objectionable metals catalytically inactive. By so reducing the activity of the contaminating metals, the production of light gases and excessive amounts of coke in the cracking process is reduced.

Thus a siliceous cracking catalyst cycling through a conversion zone and a regeneration zone in a catalytic cracking system was contacted with a mixture of about 41% $Ca_3(PO_4)_2$, 51% $CaCO_3$ and 8% MgO at a rate of about 0.25 weight percent per operating day. A bead type cracking catalyst was used which allowed observations to be made of the formation of a sacrificial sintered material externally on the siliceous catalyst and the attrition thereof to fines. It was found that even though the feed was a petroleum gas oil containing appreciable amounts of contaminating metallo organic compounds of the order of 0.8 p.p.m. Ni and 0.6 p.p.m. V, the catalyst at the end of several months' operation showed by analysis no appreciable increase in content of nickel, vanadium and iron oxide, even though the amount of catalyst make-up was substantially reduced. This indicates that the contaminating metals became incorporated in the material which was withdrawn from the system as fines. At the same time there was essentially no change in the catalyst activity.

The finely divided metal inactivating material is introduced into the circulating fluidized catalyst in an amount of one to 100 times, preferably 10–25 times, the amount of metal contaminants in the feed but no more than 10% and preferably no more than 1% by weight per average operating day based on the amount of fluidized catalyst circulating in the system. Usually at least 0.01 weight percent per operating day, based upon the catalyst inventory is required. Generally, the amount introduced is that which is no more than sufficient to control the metal contaminants and their adverse effects on the catalytic cracking process. Larger amounts are unnecessary and may adversely affect the activity of the catalyst. Within the foregoing ranges of amounts, the added material does not materially affect the cataltyic activity of the fluidized catalyst. The material can be added to the circulating catalyst in any suitable manner. For example, it can be added as a slurry to the feed being introduced into the reactor or as a dry powder with the combustion air being introduced into the regenerator.

The treating can be employed with a wide variety of fluid siliceous catalysts, especially those containing above about 50% by weight of silica. Representative materials falling into this category are the various natural and treated clays of the bentonite and kaolin types and the many synthetically prepared silica catalysts, including those containing one or more other oxides such as alumina, magnesia, zirconia or the like, as heretofore proposed for admixture with silica in preparing catalysts employed in various cracking operations. These synthetic catalysts usually contain about 70–90% $SiO_2$.

The process of the present invention is applicable to crude oil fractions or other petroleum fractions which are suitable fluid catalytic cracking charge stocks except for their high metal contaminant contents, above 0.5 p.p.m. metals. Typical feed stocks are heavy gas oils or the heavier fractions thereof in which the metal contaminants are concentrated. For example, a Southern California heavy gas oil with a 585–1050° F. boiling range and containing 1 p.p.m. Ni, 0.85 p.p.m. V and 0.67 Cu would constitute a desirable feed to a fluid catalytic cracker operated in accordance with the present invention.

In order to test the effect, particularly with respect to catalyst activity, of additions of the finely divided metal-inactivating materials to a circulating fluidized silica-alumina cracking catalyst, three different runs were conducted in a test unit (as described in Ind. & Eng. Chem., vol. 45, No. 4, April 1953, p. 849) and comprising a fixed fluidized bed operating at a 925° F. reactor temperature, 2/1 catalyst-oil ratio, and a space velocity of 3 LHSV on standard gas, oil feed. In run A, no material was added to the catalyst; in runs B and C there was added 1% and 10%, respectively, by weight based upon the catalyst of a powdered (essentially all below 2 microns in size) mixture of 40% $Ca_3(PO_4)_2$, 52% $CaCO_3$ and 8% MgO. In both runs B and C, the catalyst activity as indicated by the conversion and gasoline yield was essentially unchanged although the production of light gases was decreased, as compared to run A. At the ends of runs B and C the catalyst was fractionated and the 45–60 micron fraction analyzed for added Ca and Mg. The catalyst from run B showed about 52% of the Ca and 76% of the Mg of the added material was associated with the catalyst and 46% of the Ca and 75% of the Mg remained after water washing. The catalyst from run C showed like percentages of 50% Ca and 88% Mg before washing and 24% Ca and 42% Mg after water washing. These results indicate that the sintered product formed to a great extent in close association with the surface of the catalyst particles where the contaminating metals normally deposit. Thus, it is formed where it can incorporate the oxides of the contaminating metals as they are oxidized in the regenerator.

In another test, 0.23 weight percent of calcium lead sulfonate was added to an equilibrium synthetic silica-alumina catalyst taken from a commercial FCC unit and placed in the above-mentioned FCT unit operated on an East Texas gas oil feed. As compared to a test run in the same unit without the added calcium lead sulfonate, the addition raised the gasoline yield by about 5%, and decreased the production of light gases and coke by 5% and 6% respectively.

In a commercial FCC unit circulating 80 tons of synthetic silica plus alumina cracking catalyst having a particle size range of 20 to 100 microns, at a circulation rate of 600 t. per hour, operating on a feed consisting of virgin gas oils plus recycle of unreacted feed at a feed rate of 10,000 b./d., there was introduced as a slurry with the feed stream a mixture of 41% $Ca_3(PO_4)_2$, 51% $CaCO_3$ and 8% MgO at a rate of 150 pounds per operating day. Fines were withdrawn from the system at a rate of 1000 pounds per day. At the end of twenty days there was no change in catalyst activity as indicated by conversion capacity of the plant.

We claim:

1. In a catalytic cracking process wherein a feed containing metal contaminants in an amount of at least 0.5 p.p.m., calculated as metal, is converted in the presence of finely divided fluidized siliceous catalyst in a reaction zone, the catalyst is continuously circulated through said reaction zone and a regeneration zone and said metal contaminants normally deposit metals on said catalyst to cause undesirable production of light gases and coke, the improvement of minimizing said effects of said metal deposits which comprises introducing into the circulating catalyst finely divided material which together with at least some of the metals in said contaminants and siliceous catalyst fines forms under the conditions in the regeneration zone a sintered product containing metal of said contaminants thereby rendering said metal contaminants catalytically inactive and withdrawing sintered product from the circulating fluid catalyst, said finely divided material being selected from the group consisting of alkali metal, alkaline earth metal and boron compounds and having a particle size of less than 10 percent of that of the average for said circulating catalyst and being introduced in an amount of 1 to 100 times the amount of said metal contaminants, calculated as metal, but no more than 10 percent by weight of said circulating catalyst.

2. The process of claim 1 wherein a finely divided solid material having a particle size less than 10 percent of the average particle size of said fluidized catalyst is withdrawn from the regeneration zone for disposal.

3. The process of claim 1 wherein said finely divided material amounts to no more than 1 percent by weight of said circulating fluidized catalyst, said sintered product is attrited into fines and said fines containing metal of said contaminants are withdrawn from the circulating fluidized catalyst.

4. The process of claim 3 wherein said finely divided material in contact with said metal contaminants and catalyst is subjected to an oxidizing atmosphere in the lower portion of the regeneration zone.

References Cited

UNITED STATES PATENTS

| | | | |
|---|---|---|---|
| 2,382,755 | 8/1945 | Tyson | 208—55 |
| 2,579,133 | 12/1951 | Warner et al. | 252—413 |
| 2,638,453 | 5/1953 | Starr et al. | 212—411 |

DELBERT E. GANTZ, *Primary Examiner.*

ABRAHAM RIMENS, *Assistant Examiner.*